United States Patent Office 2,920,105
Patented Jan. 5, 1960

2,920,105

PREPARATION OF HYPERBASIC SULFONATES

Herman D. Kluge and Morris A. Wiley, Fishkill, N.Y., assignors to Texaco Inc., a corporation of Delaware No Drawing. Application December 13, 1957
Serial No. 702,547

9 Claims. (Cl. 260—504)

The instant invention relates to a process for making oil-soluble hyperbasic alkaline earth metal sulfonates. By a hyperbasic sulfonate we mean one wherein no promoter such as an alkyl phenol or an amine or a low molecular weight acid or the like is used, yet the ratio of filterably dispersed alkaline earth metal equivalents to sulfonic acid equivalents is substantially above that present in the corresponding normal alkaline earth metal sulfonate. The normal salt formula of a monosulfonic acid can be written $(RSO_3)_2Me$ where $RSO_3$ stands for the sulfonate radical and Me for the alkaline earth metal. Generally the hyperbasic sulfonate has two or more times the metal content of the corresponding normal salt.

Heretofore it has been proposed to make so-called "basic" alkaline earth metal sulfonates wherein the proportion of metal was about twice that of the normal salt, e.g., in U.S. Patent 2,585,520. Such prior art "basic" sulfonates are to be considered as a species of the hyperbasic alkaline earth metal sulfonates which are made by our process.

While not intending to be bound by any theory as to the chemical constitution of a hyperbasic sulfonate, it is our opinion that the excess of alkaline earth metal over and above that present in the normal salt is preponderantly in the form of filterable, exceedingly finely dispersed inorganic alkaline earth metal compounds. It is possible, however, that some sort of complex compound exists in the hyperbasic product. The practical value of the excess metal content is to provide a reserve of alkalinity or buffering action as, for example, when the sulfonate is used as an engine oil detergent additive.

Heretofore, it has been proposed to prepare oil-soluble alkaline earth metal sulfonates of the general type concerned herein, e.g., magnesium sulfonate, by contacting a solution of normal alkaline earth metal petroleum sulfonate, in a water immiscible solvent such as a mineral oil, with an alkaline earth metal alcoholate of a 1–4 carbon atom monohydric alcohol under substantially non-aqueous conditions, then carefully water washing the mixture.

The water washing operation is admittedly delicate. Loss of oil solubility, loss of dispersed metal content or formation of intractable emulsions can occur, particularly when preparing hyperbasic magnesium sulfonates. Furthermore, unless dehydration of the normal sulfonate starting material is virtually complete so as to obviate hydrolysis of alcoholate starting material, the resulting product tends to lack brightness after filtration or to lose it in storage. Suitable dehydration is obtained, for example, by azeotropic distillation of the normal sulfonate with a low boiling solvent such as benzene; this can be, of course, an expensive and time-consuming procedure.

Normal alkaline earth metal sulfonates can be made in a number of ways. One way is to employ a double decomposition reaction between an aqueous alkaline earth metal salt solution, e.g., an alkaline earth chloride, and the sodium salt of an oil-soluble sulfonic acid. Another way is to neutralize an oil-soluble sulfonic acid with the alkaline earth oxide and/or hydroxide or hydrated oxide. In either preparation, water is present. The bulk of the water can be removed by simple heating to 220 to 350° F. at atmospheric pressure. In such case the sulfonate or solution thereof in oil generally will retain between about 0.3 and 2 weight percent of water or even more based on the quantity of normal alkaline earth metal sulfonate present.

Advantages of our process include simplicity, reproducibility of results, economy, and ability to incorporate a very wide range and a high proportion of equivalents of alkaline earth metal relative to the number of equivalents of sulfonic acid present (particularly calcium or magnesium which are refractory in this regard) in bright, clear dispersion. The metal and sulfonic acid equivalents referred to herein are, of course, hydrogen equivalents. Furthermore, our invention permits use of an incompletely dehydrated normal sulfonate and, in fact, dehydration occurs as our process proceeds. Moreover, our process is simple and straightforward and there is no necessity of water washing at any step of the process, which washing is awkward at best, and gives rise to attendant hazards such as loss of oil solubility, loss of dispersed metal content, and formation of intractable emulsions or curds.

Our process for making oil-soluble hyperbasic alkaline earth metal sulfonates comprises forming a reaction mixture of an oil-soluble normal alkaline earth metal sulfonate in a water-immiscible organic medium and an alkaline earth metal lower alkoxy ethanolate in a vehicle of the corresponding alkoxy ethanol, the mol ratio of said alkoxy ethanolate to normal sulfonate being between about 0.5:1 and about 7:1 or even higher, said normal sulfonate starting material containing not substantially more than about the stoichiometric amount of liquid water needed to complete hydrolysis of the alkoxy ethanolate starting material into the corresponding alkaline earth metal hydroxide, stripping the mixture at temperatures of 225° and 450° F., bringing the total quantity of water introduced into the reaction mixture to an amount sufficient for obtaining complete liberation of the combined alkoxy ethanol from the alkoxy ethanolate starting material, and terminating the stripping when substantially all of the alkoxy ethanol, vehicle and hydrolysis reaction product, has been expelled from the reaction mixture.

The 3–6 carbon atom alkoxy ethanols, i.e., 2-ethoxy ethanol-1 ("Cellosolve"), 2-methoxyethanol-1 ("Methylcellosolve"), 2-propoxy ethanol-1, and 2-butoxy ethanol-1 ("Butylcellosolve"), are the lower alkoxy ethanols suitable for forming the alkaline earth metal lower alkoxy ethanolate starting materials for practice of our process. Alkaline earth methoxy ethanolates are preferred in our process because the comparatively low boiling point of methoxy ethanol adds to the ease of its recovery. Suitably, the alkoxy ethanolate is not separated from the excess alkoxy ethanol in which it was made, the alcoholate in its vehicle being suitably at concentration equivalent to between about 1.0% and about 30% (preferably 7–25%) by weight alkaline earth metal. Higher and lower concentrations of alkoxy ethanolate can also be used, if desired.

Use of the alkoxy ethanolates as the specific alcoholate reactant and alkoxy ethanol as the vehicle therefor permits maintenance of the desired elevated temperature during the stripping operation, but the boiling points of the useful alkoxy ethanols are not so high as to make virtually complete removal of the alkoxy ethanol difficult or impractical using atmospheric pressure stripping. The alkoxy ethanol vehicle of the alkoxy ethanolate appears to be responsible for the ability of the reaction mixture to tolerate the water content of the normal sulfonate starting material without initial curd formation or metal precipitation upon forming the reaction mixture.

The alkanol and its vehicle assist in making possible the incorporation and dispersal of a very wide range of filterably dispersed metal into the hyperbasic sulfonate product, a total combined and dispersed metal content of, for example, 1.5–7 times that present in the corresponding normal sulfonate. The mol ratio of alkoxy ethanolate to normal sulfonate for forming our reaction mixture is generally between about 0.5:1 and about 5:1 and can even reach 7:1, particularly when normal sulfonates of high mol weight monosulfonic acids are employed as starting material. Preferably this ratio is from about 1:1 to about 3:1. Increasing molecular weight of the sulfonic acid radical appears to enhance retention of the filterably dispersed alkaline earth metal.

As mentioned hereinbefore the normal sulfonate starting material useful in our process is ordinarily somewhat hydrous. It can contain from about .05 to about 1 times and has preferably about 0.05–0.5 times the stoichiometric amount of water needed for complete hydrolysis of the alkoxy ethanolate starting material into the corresponding alkaline earth metal hydroxide. Based on the normal sulfonate starting material employed (exclusive of oily medium) the above broad stoichiometric proportion of water, will, in the usual instance, be roughly 0.3 to 2 weight percent of the normal sulfonate. In forming the reaction mixture, use of a normal sulfonate containing water in an amount greater than about the stoichiometric for the complete hydrolysis of the alkoxy ethanolate involves risk of initial curd or gel formation, and/or loss of dispersed metal content. Dehydration of the normal sulfonate starting material to a water content so low as to have less than .05 times said stoichiometric amount usually adds expense to the process without discernible improvement. In some instances the preponderance of the water needed for hydrolysis of the alkoxy ethanolate can be supplied by a steam stripping agent as hereinafter described.

Ordinarily the amount of water introduced into the reaction mixture with the normal sulfonate is adequate for hydrolyzing only a fraction of the alkoxy ethanolate present into the corresponding alkaline earth metal hydroxide according to the reaction:

(1) $Me(OC_2H_4OR)_2 + 2H_2O \longrightarrow Me(OH)_2 + 2ROC_2H_4OH$

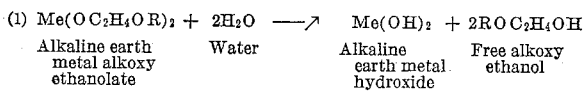

wherein R is a $C_{1-4}$ alkyl radical and Me stands for magnesium, calcium, strontium, or barium.

If an acid anhydride stripping gas such as $CO_2$ is used in the stripping step of our process, water furnished by the reaction, (2) $Me(OH)_2 + CO_2 \longrightarrow MeCO_3 + H_2O$

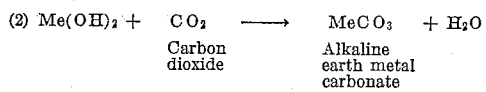

provides additional water needed for hydrolysis of the alkoxy ethanolate into the hydroxide and correspondingly less free water need be introduced in the processing. The overall equation for such operation in the event that all the hydroxide is converted to carbonate is then the sum of Equations 1 and 2, above, namely:

(3) $Me(OC_2H_4OR)_2 + H_2O + CO_2 \rightarrow$
$MeCO_3 + ROC_2H_4OH$

It has been our experience, however, that absorption of $CO_2$ in the product in sufficient proportion to indicate completion of the reaction shown in Equation 2, above, does not always occur; for example, we have never had such experience in the preparation of our hyperbasic magnesium product. As the basis for estimating initial allowable liquid water content in the normal sulfonate starting material for our operation we refer strictly to the proportions set out in Equation 1 above.

Should the liquid water in the normal sulfonate starting material be insufficient for completing hydrolysis of the entire quantity of alkoxy ethanolate used, one can add water in the form of liquid water or steam, e.g., superheated steam, continuously or at intervals to the reaction mixture as it is undergoing stripping. In general the total quantity of water to be introduced to the reaction mixture, including that introduced during the stripping operation, should be at least about 1 and generally about 1 to 6 times the stoichiometric amount needed for completing hydrolysis of the alkoxy ethanolate starting material (to break free the combined alkoxy ethanol in the alkaline earth metal alkoxy ethanolate starting material). Thus, the total of the quantity of liquid water introduced will be at least about 1 to 2 mols per mol of alkoxy ethanolate starting material when a stripping gas such as $CO_2$, acting to liberate water, is used, and it will be at least about 2 mols of water per mol of alkoxy ethanolate starting material when an inert stripping gas such as nitrogen is employed. Mixtures of inert and reactive stripping gases, of course, will demand proportions of water in between the extremes described. Also affecting the minimum amount of water needed for hydrolysis is, of course, whether it is a hyperbasic magnesium sulfonate being made or another whose parent hydroxide is more amenable to reaction with $CO_2$ to give the carbonate and some additional water for hydrolysis.

Because the excess (i.e., unreacted as being more than needed for reaction) water is stripped off of the reaction mixture readily under our operating conditions, inadvertent introduction of even substantial amounts of liquid water during the stripping period over and above the aforementioned proportions is innocuous and will not give to formation of curds or the like so long as the stripping temperature is maintained above the boiling point of water under the conditions obtaining. Actually, the stripping can be conducted very effectively and completely with superheated steam, and curds or gels are avoided even though hydrolysis is being effected during such steam stripping. In such steam stripping, the total amount of water (as steam) introduced into the operation can be far in excess of the amount needed for completely hydrolyzing the alkoxy ethanolate.

The normal alkaline earth metal sulfonate for use in our process can be made from petroleum sulfonic acids or synthetic sulfonic acids and is soluble in oily, water-immiscible organic media (which in most cases will be a synthetic hydrocarbon or a petroleum (mineral) hydrocarbon oil such as a lubricating oil fraction, a gas oil fraction, or an even lighter cut such as benzene); or the organic medium can be all or partly one or more synthetic lubricants or diluents such as a polyoxyalkylene glycol of mol weight between about 200 and 4000, a polymerized olefin, dioctyl phthalate, trioctyl phosphate, polymeric tetrahydrofuran, and polyalkyl silicone polymers in the mol weight range of 200 to 4000. By "water immiscible" we mean that the solubility of water in the medium is less than about 5% by weight at room temperature and pressure. The normal sulfonate concentration in the medium ordinarily will be between about 10 and 75 percent by weight, but is preferably between about 25 and 50 percent by weight in a hydrocarbon oil medium for economically high concentration coupled with viscosity sufficiently low to handle efficiently.

Typical oil-soluble alkaline earth metal normal sulfonates which one can utilize in the practice of our process are the oil-soluble hydrocarbyl sulfonates which include: the alkaline earth metal (Ba, Sr, Ca, and Mg) salts of petroleum sulfonic acids such as mahogany sulfonic acids, alkylated aromatic sulfonic acids, petrolatum sulfonic acids, paraffin wax sulfonic acids, petroleum naphthene sulfonic acids, polyisobutylene sulfonic acids, mono- and poly-wax substituted benzene sulfonic acids, mono- and poly-wax substituted naphthalene sulfonic acids, mono- and poly-wax substituted cyclohexyl sulfonic acids, and mixtures of the foregoing. Preferably the normal sulfonate used in our process will have been derived from a mono-sulfonic acid having a molecular weight between about 450 and 550. The molecular weight of such acid, however, can be as low as 400 for making adequately oil-soluble normal sulfonates or as high as 1500.

The stripping operation is usually conducted at least at some point in the operation with a non-condensable gas, that is, one whose critical temperature is below that of the stripping operation and whose critical pressure is above atmospheric pressure. The stripping gas can be reactive, e.g., $CO_2$ being preferred in such instance for the excellent product obtainable therewith although steam or $H_2S$, for example, can also be used. The stripping gas can also be inert, e.g., nitrogen, carbon monoxide, methane or the like; or the stripping gas can be a mixture of inert and reactive components such as a flue gas containing carbon dioxide, steam, and nitrogen. Superheated steam can also be used alone as the stripping gas or in conjunction with the foregoing stripping gases.

The gas feed rate for effecting stripping in practical time, e.g., ½ to 36 hours, can be from between about .1 and about 100 standard cubic feet (metered at 60° F. and 1 atmosphere total pressure) of stripping gas per hour per pound of mixture being treated and generally will be in the range of 1-3 s.c.f.h. per pound. (Steam at standard conditions for our purposes is assumed to be 21 cubic feet per pound.) Temperature of the stripping gas must be at least about 225° F. to obtain removal of the alkoxy ethanol at a practical rate at atmospheric pressure, but subatmospheric pressures, e.g., 10″ Hg vacuum, can be used if desired to speed the stripping. Stripping is done until substantially all of the alkoxy ethanol vehicle and other incidentally added alkoxy ethanol, and alkoxy ethanol hydrolysis reaction product (from the alkoxy ethanolate starting material) is expelled from the reaction mixture, i.e., at least about 90% and preferably more than 95% of the total available (initially free and combined) alkoxy ethanol being stripped out. The alkoxy ethanol can, of course, be recovered by conventional methods for reuse.

The temperature of the stripping operation should not be permitted to go substantially above about 500° F., particularly when a comparatively small amount of organic medium is present in the reaction mixture, lest thermal degradation of heat sensitive components occur in the reaction mixture. Preferred stripping temperature is about 275 and 375° F. and atmospheric pressure is used for efficiency and economy. It will be understood that higher and lower pressures can also be used. The hyperbasic sulfonate is usually filtered hot with conventional apparatus after stripping to give a clear, bright product for incorporation into liquid motor lubricant such as motor lubricating oil.

In the case of the hyperbasic magnesium sulfonate made by our process it is necessary to protect the product from air contact after manufacture, or to incorporate an additive which prevents formation of a scum on the surface of the hyperbasic magnesium product. Such scum is largely oil-insoluble and even small amounts are objectionable from a standpoint of haze. We have observed that about 5–15 percent (basis: weight of the total hyperbasic magnesium sulfonate product made by our process including water-immiscible medium associated therewith) of a labile hydrogen-containing compound having molecular weight from about 150 to 500 and selected from the group consisting of aliphatic hydrocarbyl amines (that is, primary and secondary amines) and aliphatic hydrocarbyl alcohols prevents formation of the scum on the hyperbasic magnesium sulfonate (whereas, by way of contrast, a similar amount of an alcohol having higher molecular weight, e.g., 6% by weight of 1200 M.W. polypropylene glycol, was not efficacious for the purpose). Use of the antiscum additive having mol weight of at least 150 provides adequate hydrocarbon oil solubility of this ingredient.

Thus, for example, we have used about 10 percent of lauryl alcohol as the anti-scum ingredient in a hyperbasic magnesium sulfonate. Alternatively we have used 10 percent of Primene JMR, which is the trade name for a tertiary alkyl primary amine having from 18 to 24 carbon atoms in the molecule, and 12 percent of Adol 52, which is the trade name for an aliphatic hydrocarbyl alcohol having average molecular weight corresponding to about 16 carbon atom content. Each of these materials has worked well to prevent occurrence of scum in the hyperbasic magnesium sulfonate.

Also, to prevent scum formation of the hyperbasic magnesium sulfonate, we can blend approximately 3–5 parts by weight of the hyperbasic sulfonate in mineral oil solution with one part of the magnesium salt of bis-alkyl phenol wherein the coupling is done with the divalent radical dimethylene imine, —$CH_2NHCH_2$—, i.e., the magnesium salt of the bis-phenol reaction product of a 14–36 carbon atom alkyl phenol with hexamethylene tetramine.

The following examples show various ways in which our invention has been practiced, but are not to be construed as limiting the invention. Unless otherwise stated, all parts are parts by weight, all percentages are weight percentages, and all temperatures are in degrees Fahrenheit.

*Example 1.*—Into an agitated reactor there was charged: 785 parts of a normal magnesium petroleum sulfonate concentrate in a naphthene base hydrocarbon oil, the concentrate containing 0.5 mol of the normal sulfonate (comprising one equivalent of petroleum sulfonic acid and amounting to approximately 470 parts of said concentrate), the oil (which was approximately 315 parts of said concentrate) having viscosity of about 100 S.S.U. at 210° F.; 429 parts of a solution of magnesium methoxy ethanolate in 2-methoxyethanol-1 ("Methylcellosolve") vehicle, said solution containing 1.25 mols of magnesium; and 869 parts of naphthene base hydrocarbon oil diluent having viscosity in the range of 96–104 S.S.U. at 100° F. Water content of the normal magnesium sulfonate starting material was 0.46 percent by weight of the normal magnesium sulfonate concentrate, and it was sufficient for hydrolyzing about 8 percent of the magnesium alkoxy ethanolate starting material into magnesium hydroxide.

The foregoing reaction mixture was heated to 350° F. while blowing with nitrogen at a rate of 1/10 the total volume (vapor and liquid space) of the reacting vessel per minute, this being equivalent to about ¼ s.c.f.h. per pound of initial reaction mixture. Then the stripping gas was switched to carbon dioxide and the mixture blown at 350° F. for 4 hours at double the initial nitrogen rate. Then this the mixture was blown for an additional hour with nitrogen at the initial rate.

Additional liquid water was then added to the reaction mixture, this added water being sufficient to liberate about one and one-half times the combined "Methylcellosolve" still in the reaction mixture, the water being added in a solvent of 114 parts of "Methylcellosolve" to obtain smooth water dispersal in the hot mixture. The mixture was then further blown at 350° F. with nitrogen at the initial rate for 1 hour, and filtered hot. The free "Methylcellosolve" and hydrolysis reaction product driven off by the stripping was condensed, collected, and measured. Less than 5 percent of the total free and combined "Methylcellosolve" charged to the operation remained unaccounted for.

The product, a clear, bright, hyperbasic magnesium sulfonate containing 1.75 mols (3.50 equivalents) of magnesium per equivalent of sulfonic acid employed was blended in a ratio of 390 parts with 82 parts of a basic magnesium bis-alkyl coupled phenolate, thereby preventing scum formation in the product sulfonate on exposure to atmosphere. The coupled phenolate was the filtered product from reacting 6020 parts (4 mols) of the bis phenol reaction product of a 280 mol weight alkylated phenol and hexamethylene tetramine with 2740 parts of magnesium methoxy ethanolate (containing 8 mols of magnesium) at 350° F. in the presence of nitrogen and subsequently of carbon dioxide. The coupled phenolate had 2.97% magnesium, 0.84% equivalent $CO_2$, and 0.66% nitrogen.

*Example 2.*—Into an agitated reactor there was charged: 263 parts of normal magnesium petroleum sulfonate concentrate in a light hydrocarbon oil, said concentrate being made from a sulfonic acid having average mol weight of about 425 and containing 0.2 mol of said normal sulfonate, the concentrate being about 66% sulfonate and and about 34% oil; 68 parts of a solution of magnesium methoxy ethanolate in a vehicle of 2-methoxy ethanol-1 ("Methylcellosolve"), said methoxy ethanolate and vehicle containing 0.2 mol of magnesium; 120 parts of naphthene base hydrocarbon oil diluent having viscosity in the range of 96 to 104 S.S.U. at 100° F.; and 0.2 mol of water. This amount of water was sufficient for hydrolyzing about 50% of the magnesium alkoxy ethanolate starting material into magnesium hydroxide.

The reaction was heated to 350° F. while blowing with nitrogen at a rate equal to the total volume (vapor and liquid space) of the reacting vessel per minute (this being equivalent to slightly more than 2 s.c.f.h. per pound of initial reaction mixture). Blowing was continued at this temperature and rate for four hours with superheated steam and carbon dioxide mixture and finally for one hour with dry carbon dioxide. The product was filtered hot. It was a bright, clear, hyperbasic magnesium sulfonate containing two equivalents of magnesium per equivalent of sulfonic acid employed.

*Example 3.*—An approximately 50% normal magnesium sulfonate concentrate in a light hydrocarbon oil solution, said concentrate containing 0.125 mol of normal magnesium petroleum sulfonate and about 0.5% water, was maintained in an agitated reaction vessel. To the normal magnesium sulfonate concentrate there was added 59 parts of a solution of magnesium ethoxy ethanolate in 2-ethoxy ethanol-1 ("Cellosolve"), said ethoxy ethanolate and vehicle containing 0.125 mol of magnesium. This reaction mixture was stripped for two hours at 350° F. with carbon dioxide, then filtered to yield a bright, clear material containing two equivalents of magnesium per equivalent of sulfonic acid present in the mixture.

By further stripping this filtrate at 350° F. for 2 hours with 35 parts of superheated steam per hour practically all of the "Cellosolve" remaining in the reaction mixture as vehicle or combined in the form of the alkanolate can be removed and recovered to yield upon filtration a bright, clear, hyperbasic magnesium sulfonate containing two equivalents of magnesium per equivalent of sulfonic acid.

In a series of preparations similar to the one in Example 2 the quantity of free water present in the initial reaction mixture was varied. When the amount of free water was raised to somewhat above the amount stoichiometrically necessary for obtaining complete hydrolysis of the magnesium methoxy ethanolate, and the batch completed and filtered, only one equivalent of magnesium per equivalent of sulfonic acid employed was found in the filtered product. This indicated that the quantity of free water in the initial reaction mixture for effective operation of the process should not be substantially above about the stoichiometric for obtaining complete hydrolysis of the alkoxy ethanolate.

*Example 4.*—To a solution of 2 mols of normal calcium monosulfonate (made from oil-soluble petroleum sulfonic acids) in a hydrocarbon diluent comprising a paraffinic base hydrocarbon oil having viscosity in the range of 96 to 104 S.S.U. at 100° F. there was added the the unfiltered reaction product of a mol of calcium metal with methoxy ethanol ("Methylcellosolve"), 12.7 mols of Methylcellosolve being used in the reaction and the unreacted alkoxy ethanol being unseparated from said reaction product. The water present in the sulfonate used was sufficient to hydrolyze roughly 10% of the calcium methoxy ethanolate into calcium hydroxide. The mixture was heated with nitrogen blowing to 350° F., further blown at 350° F. with superheated steam and $CO_2$ for an hour, then finished with $CO_2$ blowing for an hour at this temperature. This amount of steam and $CO_2$ used was substantially in excess of the amount stoichiometrically needed to liberate all the combined methoxy ethanol added to the reaction mixture in the form of calcium methoxy ethanolate. At the end of the stripping period virtually no methoxy ethanol remained in the reaction mixture. Upon filtration there resulted a hyperbasic calcium sulfonate containing 3.4% calcium and having a metal ratio of approximately 2.

*Example 5.*—Barium methoxy ethanolate suitable for use in our process was prepared by refluxing a mixture of 171 parts of barium hydroxide, $Ba(OH)_2$, with 1520 parts of methoxy ethanol ("Methylcellosolve"), filtering, mixing the filtrate with 176 parts of dry benzene, then dehydrating the mixture by azeotropic distillation. The benzene-water distillate was condensed and separated with the benzene phase being refluxed until no further separation of aqueous phase from the condensate occurred. Thereafter the bulk of the benzene was stripped from the distilland. This product could be used in a manner similar to the magnesium methoxy ethanolate of Example 2 for preparation of a corresponding hyperbasic barium petroleum sulfonate.

We claim:

1. A process for preparing oil-soluble hyperbasic alkaline earth metal hydrocarbyl sulfonates which comprises: forming a reaction mixture of an oil-soluble normal alkaline earth metal hydrocarbyl sulfonate, a water-immiscible organic medium, and an alkaline earth metal lower alkoxy ethanolate in a vehicle of the corresponding alkoxy ethanol, the mol ratio of said alkoxy ethanolate to said normal sulfonate being between about 0.5:1 and about 7:1, said normal sulfonate starting material containing water in an amount within the range of from 0.05 times to not substantially more than the stoichiometric amount of liquid water needed for complete hydrolysis of the alkoxy ethanolate starting material into the corresponding alkaline earth metal hydroxide, stripping the mixture at temperature of 225° to 500° F., bringing the total quantity of water introduced into the reaction mixture to an amount at least stoichiometrically sufficient for obtaining complete liberation of the combined alkoxy ethanol from the alkoxy ethanolate starting material under the stripping conditions prevailing, and terminating the stripping when substantially all of the alkoxy ethanol, vehicle and hydrolysis reaction product, has been expelled from the reaction mixture.

2. The process of claim 1 wherein the reaction mixture is stripped with a gas comprising carbon dioxide.

3. The process of claim 1 wherein the reaction mixture is stripped with a gas comprising superheated steam.

4. The process of claim 1 wherein the reaction mixture is stripped with a gas comprising nitrogen.

5. The process of claim 1 wherein the normal sulfonate starting material contains .05–0.5 times the stoichiometric amount of liquid water needed for complete hydrolysis of the alkoxy ethanolate starting material into the corresponding alkaline earth metal hydroxide.

6. The process of claim 1 wherein said alkoxy ethanolate is a methoxy ethanolate, and the stripping is conducted at atmospheric pressure and at a temperature between 275° and 375° F. for about ½ to about 36 hours.

7. The process of claim 1 wherein said starting materials are magnesium compounds.

8. The process of claim 1 wherein said starting materials are calcium compounds.

9. The process of claim 7 wherein the overbased magnesium sulfonate product is protected from scum formation by blending it with a labile hydrogen-containing compound of molecular weight from about 150 to 500 selected from the group consisting of aliphatic hydrocarbyl amines and alcohols.

References Cited in the file of this patent

UNITED STATES PATENTS 2,585,520      Van Ess et al.  ---------- Feb. 12, 1952